(12) United States Patent
Moran

(10) Patent No.: US 9,203,547 B1
(45) Date of Patent: Dec. 1, 2015

(54) SIMPLIFIED APPARATUS FOR POSITIVELY PREVENTING THE USE OF MOBILE PERSONAL COMMUNICATION DEVICES

(71) Applicant: Martin Moran, Wethersfield, CT (US)

(72) Inventor: Martin Moran, Wethersfield, CT (US)

( * ) Notice: Subject to any disclaimer, the term of this patent is extended or adjusted under 35 U.S.C. 154(b) by 0 days.

(21) Appl. No.: 14/508,316

(22) Filed: Oct. 7, 2014

(51) Int. Cl.
*H04K 3/00* (2006.01)
*B60W 40/105* (2012.01)
*H04M 1/60* (2006.01)
*H04M 1/725* (2006.01)

(52) U.S. Cl.
CPC .............. *H04K 3/415* (2013.01); *B60W 40/105* (2013.01); *H04K 3/45* (2013.01); *H04M 1/6075* (2013.01); *H04M 1/72569* (2013.01); *H04M 1/72577* (2013.01)

(58) Field of Classification Search
CPC ..... H04K 3/415; H04K 3/45; H04M 1/72577; H04M 1/72569; H04M 1/6075; H04M 1/72527; H04W 4/027; B60W 40/105

USPC .................................................. 455/569.1
See application file for complete search history.

(56) References Cited

U.S. PATENT DOCUMENTS

| 2002/0132646 | A1* | 9/2002 | Girod | H04K 3/41 455/569.2 |
| 2010/0035588 | A1* | 2/2010 | Adler | H04M 3/42178 455/414.1 |

* cited by examiner

*Primary Examiner* — Raymond Dean
(74) *Attorney, Agent, or Firm* — McCormick, Paulding & Huber, LLP

(57) ABSTRACT

A simplified apparatus for positively preventing the use of mobile personal communication devices by the operator of a vehicle in "hand held" mode, and permitting use of such devices in "handsfree" mode. The apparatus includes a signal jammer operable to block at least one of the incoming and outgoing signals associated with the personal mobile communication device; a power supply associated with the signal jammer; a motion responsive sensor in the vehicle, which is configured to activate the signal jammer while the vehicle is in motion; and a pairing signal detector, which is configured to de-activate the signal jammer while a handsfree pairing signal is present.

9 Claims, 1 Drawing Sheet

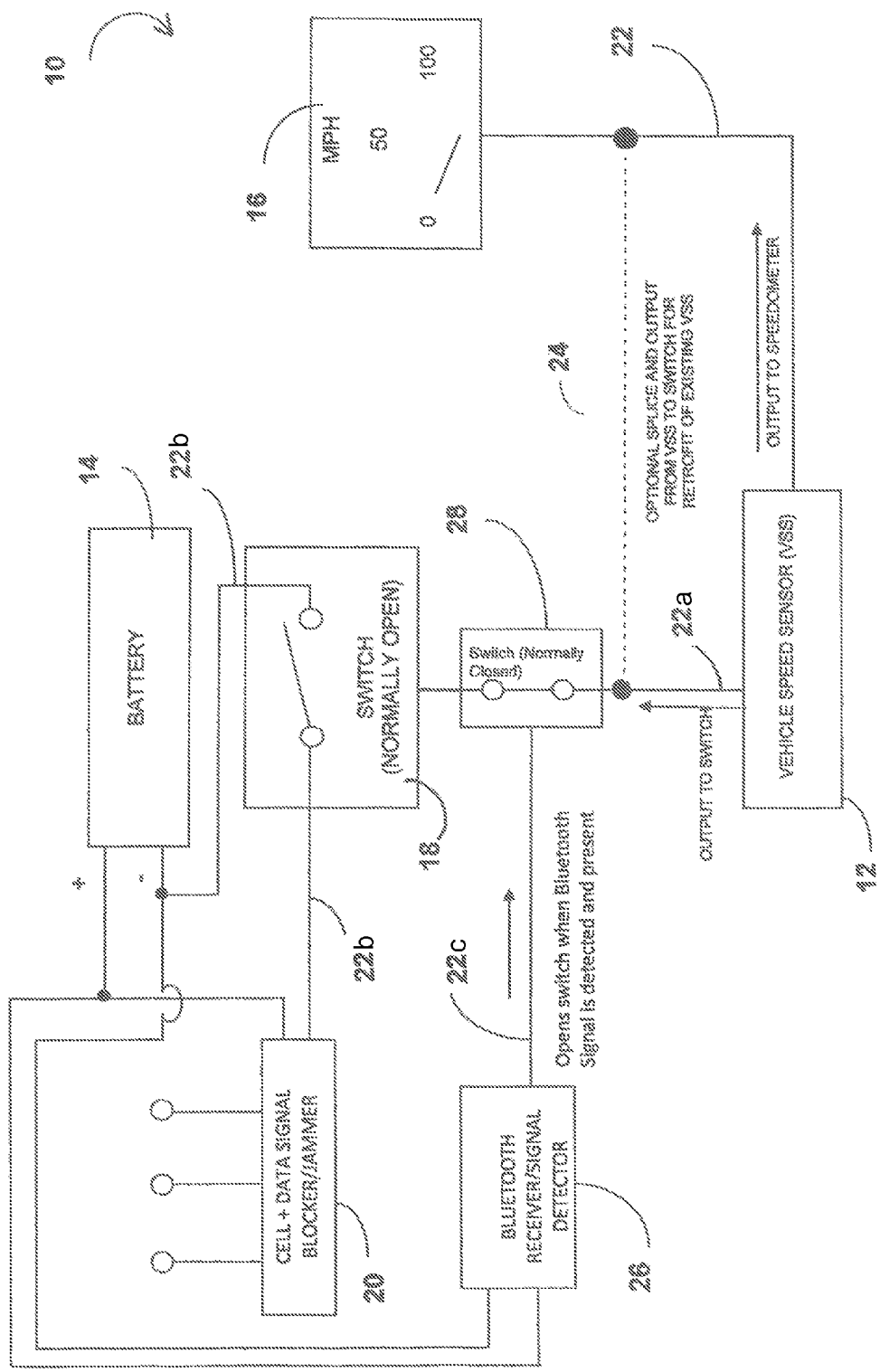

SIMPLIFIED APPARATUS FOR POSITIVELY PREVENTING THE USE OF MOBILE PERSONAL COMMUNICATION DEVICES

BACKGROUND OF THE INVENTION

The use of mobile personal communication devices has grown exponentially over the past several years and is ubiquitous at the present time. These devices fulfill very important needs for many people in providing instant communication with others at almost any location throughout the world as well as access to information from the Internet and other sources. The same devices can however also create life-threatening hazards when used in vehicles by the operator of the vehicle in a hand-held mode, as opposed to a "hands free" mode, and when they result in distraction of the operator and in serious accidents. As a result, the majority of states have now outlawed the use of hand-held mobile personal communication devices in by the operators of vehicles and a number of prior art devices have been developed to disable such devices. The available prior art devices may be generally satisfactory but are in many instances complex in design and operation and thus readily disabled or overridden. They may also allow the operator of the vehicle to select a threshold speed below which a mobile communications device may be used while the vehicle is moving, ignoring the fact that there is no safe speed no matter how slow at which to operate said devices in a hand-held mode. Additionally, the available prior art does not allow for the safe and legal operation of these devices in "hands free" mode while operating a moving vehicle by utilizing commonly available Bluetooth connectivity, with which one can make a phone call and talk without taking their eyes and attention off the road, and with which one can text by utilizing commercially available "talk to text" applications.

It is the general object of the present invention to provide a simplified and yet highly positive disabling apparatus for a personal mobile communication device used in a vehicle by the operator of the vehicle in hand-held mode, while allowing the device to be used in a vehicle by the operator of the vehicle in hands-free mode.

SUMMARY OF THE INVENTION

In fulfillment of the foregoing object and in accordance with the present invention, a simplified apparatus which positively prevents the use of a mobile personal communication device by the operator of a motor vehicle is provided and comprises a motion responsive sensor in the vehicle which senses vehicle speed, switching means operable by the sensor when the vehicle is in motion, a signal jammer operable by the switching means to block at least one of the incoming and outgoing signals associated with the mobile personal communication device when the vehicle is in motion, a power supply for the jammer, and an additional switching means operable by a Bluetooth signal detector/receiver.

Preferably, the motion responsive sensor takes the form of a conventional speed sensor of the type found in current motor vehicles and which emits electrical pulses transmitted to the vehicle speedometer when the vehicle is in motion.

The switching means preferably comprises a simple normally open switch connected by electrical conduit means with the speed sensor and, on its output side, with the signal jammer.

The signal jammer may be of a conventional type and is preferably adapted to jam outgoing signals from the personal communication device. The jammer may be connected with the vehicle battery or may have an internal power supply so as to be less vulnerable to tampering.

The invention includes a feature which allows the operator of a moving vehicle to operate and use a mobile communications device in "hands-free" mode, that is, in a mode that does not require the operator to hold, look at and/or push buttons on a mobile communications device. When a Bluetooth signal is detected, a normally closed switch is opened, preventing the signal jammer from operating and allowing use of the mobile communications device in "hands-free" mode.

DRAWINGS

The single FIGURE of the drawings is a schematic representation of the invention in block form.

DESCRIPTION OF THE PREFERRED EMBODIMENTS OF THE INVENTION

Referring to the single FIGURE of the drawings, the apparatus of the invention is indicated generally by the reference numeral 10. A motion responsive device is indicated at 12, and may for example take the form of a vehicle speed sensor of a conventional type found on motor vehicles at the present time. Such a speed sensor emits signals in the form of electrical pulses with the frequency of the pulses dependant on the speed of the vehicle and transmits the signals to a vehicle speedometer 16 through electrical conduit means 22. The motion responsive device 12 is connected, via an electrical conduit means 22a, with a switch means, e.g., in the form of a normally open switch 18. The normally open switch 18 is positioned to connect or interrupt an electrical conduit means 22b, which connects a power supply 14 (e.g., the vehicle battery) to a signal jammer 20. The signal jammer 20 is the component that prevents operation of a personal mobile communication device within the vehicle. It defeats operation of such devices by jamming wireless signals within at least one of an ingoing or outgoing frequency band associated with such devices.

As will be apparent, electrical pulses emitted by the speed sensor in response to vehicle movement not only will operate the speedometer 16 but also will cause the normally open switch 18 to close thus energizing the signal jammer 20 in a simple and straightforward manner which is relatively foolproof and minimally subject to being disabled or overridden.

As another option, the motion responsive device 12 may be configured to act in a stand-alone manner, basing its activation of the switch 18 on the state of an internal component such as an accelerometer, motion-sensitive switch, or the like that varies according to vehicle motion. Rather than using the vehicle battery as the power supply 14, the switch 18 may instead connect the signal jammer 20 to an independent power supply 14 that is contained within the apparatus 10.

The signal jammer 20, which acts to block at least one of the incoming and outgoing signals to the mobile personal communication device, may be conventional and may be provided with a function whereby preselected areas can be blocked. Thus, the jammer may be operable to block all signals within a specified radius, or within only the interior volume of the vehicle, or within only a selected portion of the interior volume of the vehicle. The signal jammer 20 will be located in an area not normally accessible to the operator of the moving vehicle such as behind the dashboard, or in the engine compartment, or in the headliner, or beneath one of the seats, or inside one of the seats, or inside the trunk, or inside a door. Location of the signal jammer 20 will depend upon the design and size of the vehicle in which it is installed.

In an alternative embodiment of the invention and in a retrofit arrangement, the switch 18 may be connected with the electrical conduit means 22 which extends to the speedometer 16 by tapping into or splicing with the conduit means 22 as indicated by electrical conduit means 24. Operation of the apparatus is identical with that described above.

The apparatus 10 may also include a pairing detector 26, which in the drawing FIGURE is shown specifically as a Bluetooth wireless signal detector ("Bluetooth" being the ordinary name used for a particular wireless signal frequency band and protocol, used for wireless headset and the like handsfree devices). The pairing detector 26 is configured and connected to de-activate the signal jammer 20, in case the mobile personal communications device is paired with a hands-free device to enable communication via the mobile within legal constraints. For example, in the drawing FIGURE the pairing detector 26 is shown as connected, via an electrical conduit 22c, to actuate a normally closed switch 28. When opened by operation of the pairing detector 26, the normally closed switch 28 can interrupt the electrical conduit 22a by which the motion responsive device 12 would close the normally open switch 18 in order to deliver power to the signal jammer 20 via the electrical conduit 22b. Thus, when the pairing detector 26 detects the presence of a mobile personal communications device being used in the legal and safe "hands-free" mode, it opens the normally closed switch 28, disabling the conduit connection 22a from the vehicle speed sensor 12 to the normally open switch 18, and preventing the signal jammer 20 from being energized.

In certain embodiments, the pairing detector 26 may be configured to detect handsfree operation based on a paired condition indicated or broadcast by the vehicle stereohead. In other embodiments, the pairing detector 26 may be incorporated along with the rest of the apparatus 10 as part of a hands-free device that is configured for pairing with the personal mobile communication device. Then, when the hands-free device is paired with the mobile to permit handsfree activation, the signal jammer 20 will be turned off; otherwise, while the vehicle is in motion, the signal jammer 20 will prevent operation of the mobile.

From the foregoing it will be apparent that a simplified and positively acting apparatus has been provided for preventing unsafe use of a personal mobile communication device by an operator of a vehicle in motion. Moreover, the apparatus can automatically reconfigure itself to permit safe and legal hands-free use of a personal mobile communication device.

The invention claimed is:

1. Apparatus for positively preventing use, by an operator of a vehicle, of a mobile personal communication device in hand held mode; said apparatus comprising:
   a signal jammer operable to block at least one of the incoming and outgoing signals associated with the personal mobile communication device;
   a power supply associated with the signal jammer;
   a motion responsive device, which is configured to activate the signal jammer while the vehicle is in motion; and
   a pairing signal detector, which is configured to de-activate the signal jammer while a pairing signal is present between the personal mobile communication device and a handsfree device in the vehicle.

2. The apparatus as claimed in claim 1, wherein the motion responsive device is connected to monitor a conventional vehicle speed sensor.

3. The apparatus as claimed in claim 2, wherein the motion responsive device is connected with the conventional vehicle speed sensor and with a vehicle speedometer, in a retrofit configuration, by tapping into an electrical conduit provided between the conventional vehicle speed sensor and the vehicle speedometer.

4. The apparatus as claimed in claim 1, wherein the motion responsive device includes an electrical connection from the vehicle alternator to the signal jammer, so that the signal jammer is activated while the vehicle engine is running.

5. The apparatus as claimed in claim 1, wherein the motion responsive device is configured to activate the signal jammer by closing a normally open switch, which when closed connects the signal jammer to an electrical power supply.

6. The apparatus as claimed in claim 5, wherein the electrical power supply is not the vehicle battery.

7. The apparatus as claimed in claim 1, wherein the signal jammer is adapted to selectively block signals within a portion of the vehicle.

8. The apparatus as claimed in claim 1, wherein the pairing detector is configured to detect presence of a pairing signal based on a paired condition indicated by the vehicle stereohead.

9. The apparatus as claimed in claim 1, wherein the apparatus is incorporated into a handsfree device configured for pairing with the personal mobile communication device.

* * * * *